United States Patent
Mihashi et al.

(10) Patent No.: US 6,818,056 B2
(45) Date of Patent: Nov. 16, 2004

(54) HIGH PERFORMANCE FIBER REINFORCED CEMENTITIOUS COMPOSITION AND PREMIX THEREFOR

(75) Inventors: Hirozo Mihashi, 11-21, Teraoka 3-chome, Izumi-ku, Sendai-shi, Miyagi (JP), 981-3204; Hiroshi Fukuyama, Tsukuba (JP); Haruhiko Suwada, Tsukuba (JP); Tooru Tanaka, Tokyo (JP)

(73) Assignees: Hirozo Mihashi, Miyagi (JP); Building Research Institute, Ibaraki (JP); Director General of National Institute for Land and Infrastructure Management, Ministry of Land, Infrastructure and Transport, Ibaraki (JP); Tokyo Rope Mfg. Co. Ltd., Tokyo (JP)

( * ) Notice: Subject to any disclaimer, the term of this patent is extended or adjusted under 35 U.S.C. 154(b) by 0 days.

(21) Appl. No.: 10/456,394

(22) Filed: Jun. 5, 2003

(65) Prior Publication Data

US 2004/0107873 A1 Jun. 10, 2004

(30) Foreign Application Priority Data

Dec. 5, 2002 (JP) ........................................ 2002-353650

(51) Int. Cl.$^7$ .......................... C04B 14/48; C04B 16/00; C04B 22/04
(52) U.S. Cl. ........................................ 106/644; 106/643
(58) Field of Search ................................. 106/643, 644

(56) References Cited

U.S. PATENT DOCUMENTS 6,723,162 B1 * 4/2004 Cheyrezy et al. ........... 106/644

* cited by examiner

Primary Examiner—Anthony J. Green
(74) Attorney, Agent, or Firm—Jordan and Hamburg LLP

(57) ABSTRACT

To provide a high ductility to tensile load and compressive load and to enhance workability, the present invention provides a high performance fiber reinforced cementitious composition comprising fragments of a steel cord stranded wire accounting for 0.5 vol % or more and less than 1.5 vol % and fragments of at least one type of organic fibers accounting for 2.5 vol % or less.

6 Claims, 6 Drawing Sheets

Stress—strain diagram in compression test

Stress-strain diagram in cyclic tension-compression test on PE-HPFRCC

Stress-strain diagram in cyclic tension-compression test on PS-HPFRCC

Loading hysteresis

Maximum shear crack width—deflection angle relationship in bar arrangement type 1

Maximum shear crack width—deflection angle relationship in bar arrangement type 2

HIGH PERFORMANCE FIBER REINFORCED CEMENTITIOUS COMPOSITION AND PREMIX THEREFOR

BACKGROUND OF THE INVENTION

1. Field of the Invention

The present invention relates to a high performance fiber reinforced cementitious composition and a premix for producing the high performance fiber reinforced cementitious composition.

2. Description of the Related Art

Conventionally, single steel wires hooked at both ends are often mixed to cementitious composites (compositions) for the application to a tunnel spraying work or the like, but they are added only to prevent the peeling of concrete.

Further, fragments of fiber such as polyethylene are also mixed to the cementitious compositions to prevent a large cracking caused by tensile load.

SUMMARY OF THE INVENTION

The present invention has an object to provide a high performance fiber reinforced cementitious composition (composite) having high ductility (toughness) to both tensile load and compressive load when hardened.

The present invention further has an object to provide a high performance fiber reinforced cementitious composition having a good workability.

The present invention still further has an object to provide a premix (material) for producing the high performance fiber reinforced cementitious composition.

The high performance fiber reinforced cementitious composition (composite) (mixture) according to the present invention comprises fragments (pieces) of a steel cord stranded (twisted) wire accounting for 0.5 vol % or more and less than 1.5 vol %; and fragments (pieces) of at least one type of organic fibers accounting for 2.5 vol % or less.

The high performance fiber reinforced cementitious composition (mixture), in general, may further comprise cement, water and aggregates (sand, gravel, etc.) (the volume occupied by moisture is reduced in the hardened state) in addition to the above-mentioned steel cord stranded wire fragments (pieces) and the organic fiber fragments (pieces). Further, admixtures (a material other than water, cement and aggregate) including a water-reducing admixture (agent), etc. may be added to the high performance fiber reinforced cementitious composition.

The steel cord stranded wire fragment is composed of two or more mutually stranded single wires as described later, and spiral lines (of protruding shape or recessed-groove shape) are present on the surface of the steel cord stranded wire fragment overall since the respective single wires are spirally deformed. Accordingly, the surface of the steel cord stranded wire fragment has high frictional resistance over the whole length. The high performance fiber reinforced cementitious composition in itself is resistant to a large compressive load when hardened, because it is a cementitious material. Further, since the fragments of the steel cord stranded wire randomly present in the hardened high performance fiber reinforced cementitious composition resist the stress acting in a direction orthogonal to the application direction of the compressive load, the ductility (toughness) in the orthogonal direction of the hardened cementitious composition is enhanced. Moreover, the fragments of the steel cord stranded wire randomly present in the hardened high performance fiber reinforced cementitious composition also act to enhance the ductility to tensile load. The hardened high performance fiber reinforced cementitious composition is consequently provided with high ductility to both compressive load and tensile load.

The steel cord stranded wire fragment may be composed of three or more stranded steel-made single wires, and the way (method) of stranding (twist) may be optionally determined. When the stranding pitch magnification [the stranding pitch length (mm)/the diameter (mm) of steel cord stranded wire fragment] is 15 or less, the steel cord stranded wire fragment is difficult to fray, and the adhesion to cement is also sufficiently ensured. The cut surface of the steel cord stranded wires may be subjected to welding or the like to prevent the fraying.

The length of the steel cord stranded wire fragment is 15 mm or more and 45 mm or less. When the length of the steel cord stranded wire fragment is 15 mm or more, the high ductility to compressive load and tensile load can be kept as described above. When the length of the steel cord stranded wire fragment is 45 mm or less, the mutual tangles of the steel cord stranded wire fragments can be prevented when kneading the steel cord stranded wire fragments with cement, water, aggregates and the like for the production of the high performance fiber reinforced cementitious composition, and the fluidity can be thus ensured to enhance the workability.

The steel cord stranded wire fragments can be efficiently produced by cutting a steel cord stranded wire in the above-mentioned length.

In the high performance fiber reinforced cementitious composition according to the present invention, the fragments of the steel cord stranded wire accounts for 0.5 vol % or more and less than 1.5 vol %. With 0.5 vol % or more, a brittle failure (fracture) by the cracking caused by tensile and compressive loads can be prevented. With less than 1.5 vol %, the mutual tangles of the steel cord stranded wire fragments can be prevented when kneading the steel cord stranded wire fragments with cement, water, aggregates and the like for the production of the high performance fiber reinforced cementitious composition, and the fluidity can be thus ensured to enhance the workability.

The concept of the organic fiber includes chemical synthetic fiber such as polyethylene, vinylon and aramid, and the organic fiber may be a single filament, fiber, thread or string, or a twisted or stranded one. The fragments of the multiple organic fibers mixed to the high performance fiber reinforced cementitious composition can prevent the large cracking caused by compressive load or tensile load. Accordingly, the high performance fiber reinforced cementitious composition material with the organic fiber fragments mixed thereto is improved in compressive strength and tensile strength, and high ductility to compressive load and tensile load can be provided.

The diameter of the organic fiber fragment is smaller than that of the steel cord stranded wire. Therefore, since the organic fiber fragments are bonded to cement in a range (radial direction) smaller than the steel cord stranded wire fragments are, the high performance fiber reinforced cementitious composition comprising the both can be provided with ductility further higher than the ductility obtained in a one comprising only the steel cord stranded wire fragments.

Organic fiber fragments having various diameters can be used. When the usable organic fiber fragments are defined on the basis of aspect ratio, the aspect ratio of the organic fiber fragments is 2500 or less. According to this, the high ductility to tensile load and compressive load can be kept, and the mutual tangles of the organic fiber fragments can be prevented when kneading the steel cord stranded wire fragments and the organic fiber fragments with cement, water, aggregates and the like for the production of the high performance fiber reinforced cementitious composition.

When the multiple organic fiber fragments account for 2.5 vol % or less, the high ductility to tensile load and compressive load can be kept. Further, in the production of the high performance fiber reinforced cementitious composition, the organic fiber fragments provide proper viscosity in the kneading to prevent the settlement of the steel cord stranded wire fragments. Consequently, since the steel cord stranded wire fragments are properly dispersed, and the multiple organic fiber fragments are also dispersed without tangling, the fluidity can be ensured to enhance the workability. The organic fiber fragments further preferably account for 1.5 vol % or less. Although the use of the organic fiber fragments is dispensable, the mixing thereof would be better off, or 0 vol % is not included (except or more than 0 vol %, hereinafter the same as above). More preferably, the organic fiber fragments of 0.1 vol % or more can provide the effect of ductility.

The high performance fiber reinforced cementitious composition of the present invention is used as civil engineering and building materials such as column material and wall panel. The hardened high performance fiber reinforced cementitious composite material may be a part of a structure. (e.g., column, etc.)

In the production of the high performance fiber reinforced cementitious composition, the steel cord stranded wire fragments of 0.5 vol % or more and less than 1.5 vol %; the organic fiber fragments of 2.5 vol % or less (preferably not including 0 vol % although 0 vol % may be adapted, more preferably 0.1 vol % or more, which can provide the effect of ductility); cement of 20 vol %–35 vol %; water of 35 vol %–55 vol %; and aggregates of 25 vol %–35 vol % are mixed. These are kneaded to disperse the steel cord stranded wire fragments and the organic fiber fragments, and then poured to a form of an optional shape followed by hardening.

A premix (material) (except water and aggregates) for producing the high performance fiber reinforced cementitious composition of the present invention comprises fragments of a steel cord stranded wire accounting for 1.3 vol % or more and less than 6.9 vol %; fragments of at least one type of organic fibers accounting for 10.8 vol % or less (preferably not including 0 vol % although 0 vol % may be adapted, more preferably 0.4 vol % or more, which can provide the effect of ductility); and cement accounting for 83 vol % or more and less than 98 vol %.

Another premix (material) (except water) for producing the high performance fiber reinforced cementitious composition of the present invention comprises fragments of a steel cord stranded wire accounting for 0.68 vol % or more and less than 3.6 vol %; fragments of at least one type of multiple organic fibers accounting for 5.8 vol % or less (preferably not including 0 vol % although 0 vol % may be adapted, more preferably 0.2 vol % or more, which can provide the effect of ductility); cement accounting for 34 vol % or more and less than 63 vol %; and aggregates accounting for 34 vol % or more and less than 63 vol %.

When such a premix (material) for producing the high performance fiber reinforced cementitious composition is used, the premix (material) can be mixed and kneaded with a required prescribed quantity of water and the like without paying attention to the mixing quantity of the steel cord stranded wire fragments, the organic fiber fragments or the like when the high performance fiber reinforced cementitious composition is produced in a construction site. Accordingly, the efficiency of the work can be enhanced. The premix (material) can be laid in a portable state by putting it in a bag, a container or the like.

DESCRIPTION OF PREFERRED EMBODIMENTS

A high performance fiber reinforced cement composition (hereinafter referred to as PS-HPFRCC) comprises fragments of a steel cord stranded wire and fragments of polyethylene fiber that are multiple organic fibers, which are mixed to mortar. The volume ratio of water, cement, sand, the steel cord stranded wire fragments, the organic fiber fragments, and admixtures including a water-reducing admixture, which constitute the PS-HPFRCC, is 45.5:26:25:1:1:1.5. PS-HPFRCC (in a hardened state) has a compressive strength of 54.5 N/mm$^2$ and a Young's modulus of $1.82 \times 10^4$ N/mm$^2$.

To produce this PS-HPFRCC, cement, sand and admixtures are dry kneaded, water and the water-reducing admixture are added followed by kneading into a non-hardened state, and the polyethylene fiber fragments and the steel cord stranded wire fragments are mixed thereto and dispersed by kneading. Thereafter, the resulting composition (composite) is poured in a form of an optional shape as it is in the non-hardened state, and then hardened.

The PS-HPFRCC contains 1 vol % of the multiple steel cord stranded wire fragments. The steel cord stranded fragment is obtained by stranding (twisting) five steel-made single wires and cutting the resulting steel cord stranded wire with a diameter of 0.405 mm and a stranding pitch of 4.48 mm in a length of 32 mm. The PS-HPFRCC further contains 1 vol % of the multiple polyethylene fiber fragments. The polyethylene fiber fragment (strand or single fiber) is obtained by cutting polyethylene fiber with a diameter of 0.012 mm in a length of 15 mm.

The experimental results for PS-HPFRCC that is the above-mentioned high performance fiber reinforced cementitious composition are then described below. For comparison, mortar and a cementitious composition comprising polyethylene fiber fragments mixed to mortar (hereinafter referred to as PE-HPFRCC) were used. The mortar has the same composition as the above-mentioned PS-HPFRCC from which the steel cord stranded wire fragments and the polyethylene fiber fragments are removed, and the PE-HPFRCC has the same composition as the above PS-HPFRCC from which the steel cord stranded wire fragments are removed. The PE-HPFRCC contains 1 vol % of the polyethylene fiber fragments. The polyethylene fiber is the same as that contained in the PS-HPFRCC.

Figure 1:
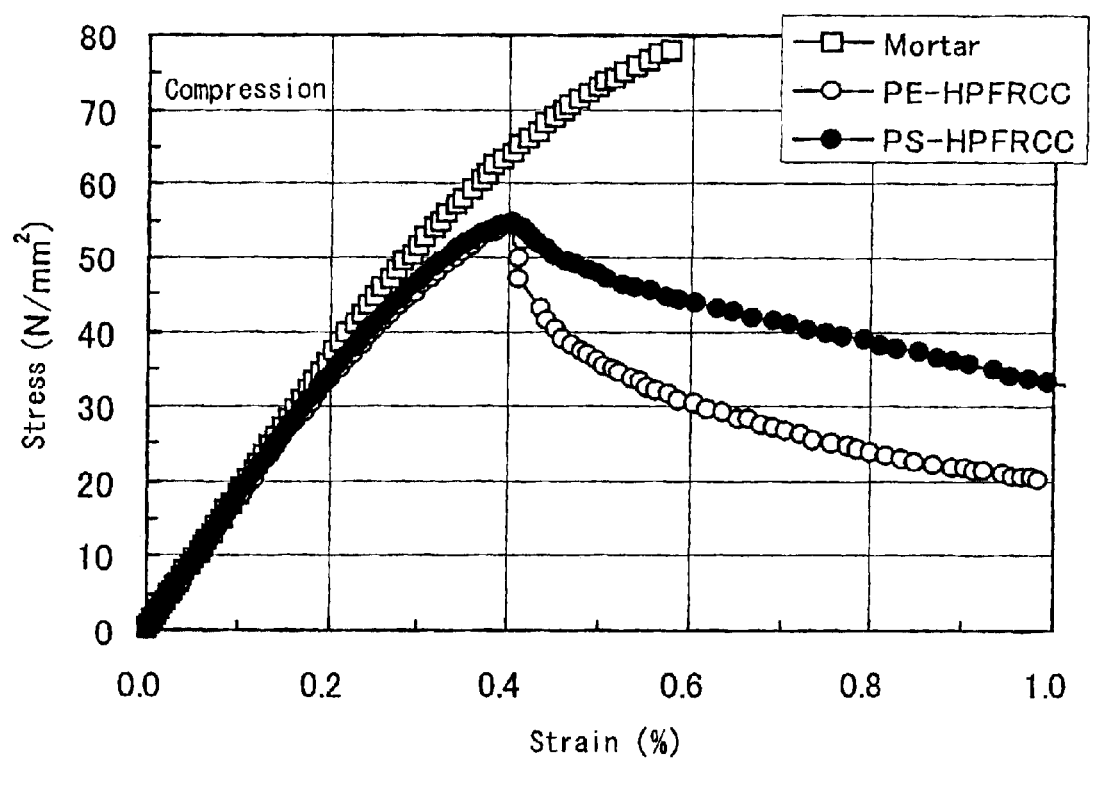
FIG. 1 is a diagram showing the relationship between stress and strain in compression tests.

FIG. 1 shows the relationships between stress and strain in compressive tests. In the mortar (hereinafter referred to as MO for short), the strain was increased according to increase in stress, causing a failure (fracture) at a stress of about 80 N/mm$^2$. In PE-HPFRCC (hereinafter referred to as PE for short) and PS-HPFRCC (hereinafter referred to as PS for short), the strain was increased according to increase in stress, and maximized at a stress of about 55 N/mm$^2$ (where the strain is about 0.4%). Thereafter, the stress was reduced according to increase in strain. The reduction in stress according to increase in strain was smaller in PS than in PE. This shows that PS absorbs more energy up to the failure (fracture).

Figure 2:
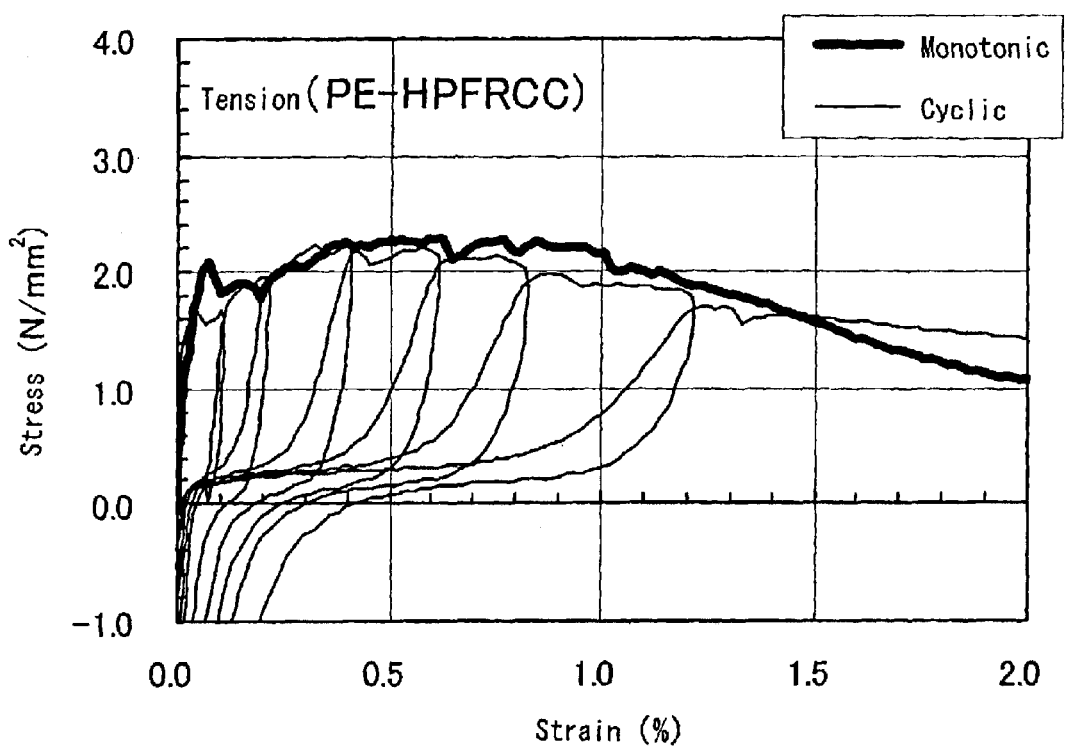
FIG. 2 is a diagram showing the stress-strain relationship in cyclic tension-compression tests on PE-HPFRCC.

FIG. 2 shows the relationship between stress and strain of PE (PE-HPFRCC) in cyclic tension-compression tests, wherein monotonic tensile tests and cyclic tension-compression tests were carried out to mutually compare the results. The result obtained in the cyclic tension-compression tests shows substantially the same stress-strain relationship as in the monotonic tensile tests.

Figure 3:
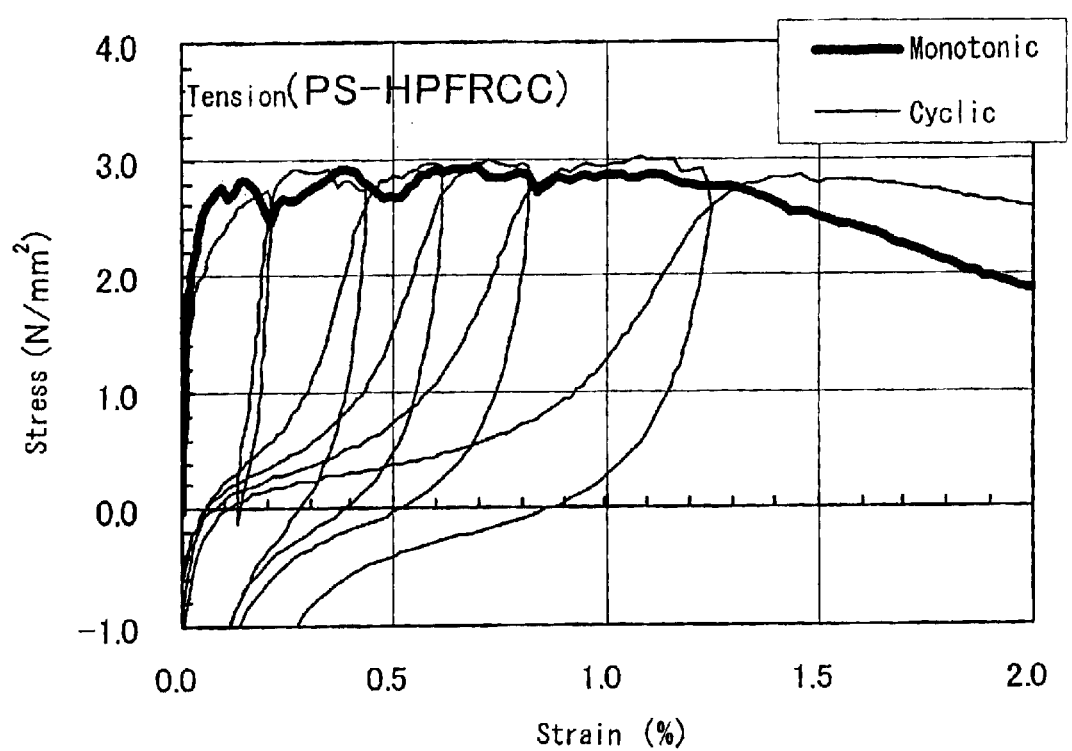
FIG. 3 is a diagram showing the stress-strain relationship in cyclic tension-compression tests on PS-HPFRCC.

FIG. 3 shows the relationship between stress and strain of PS (PS-HPFRCC) in cyclic tension-compression tests, wherein monotonic tensile tests and cyclic tension-compression tests were carried out to mutually compare the results. The result obtained in the cyclic tension-compression tests shows substantially the same stress-strain relationship as in the monotonic tensile tests. Further, the stress is larger in PS than in PE as the whole, compared with FIG. 2. Accordingly, PS can absorb more energy up to the failure (fracture) than PE.

Figure 4:
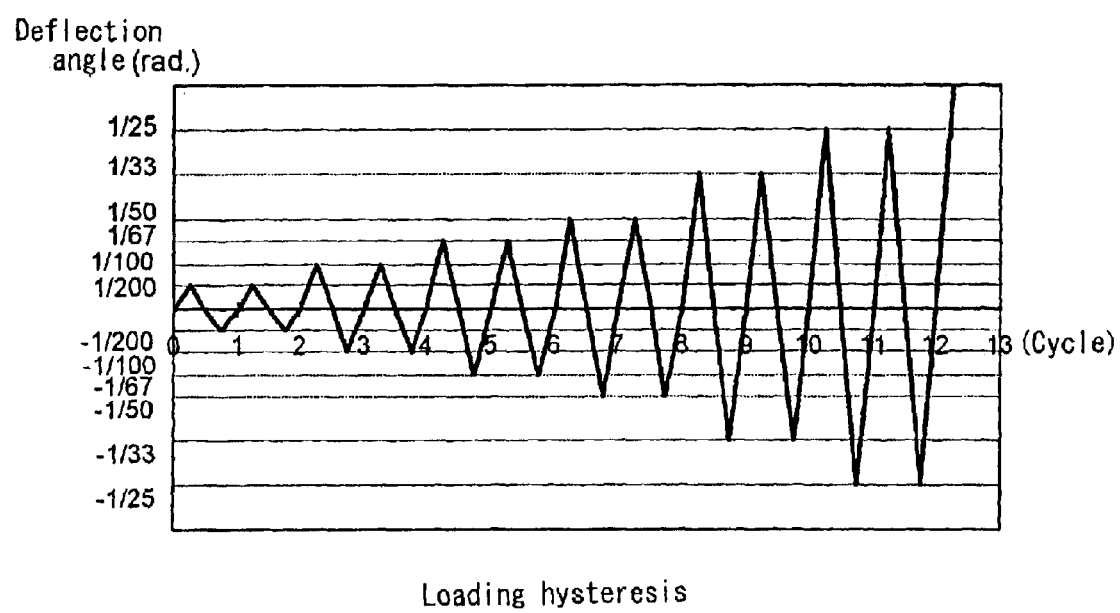
FIG. 4 shows the loading hysteresis in a loading test.
Figure 5:
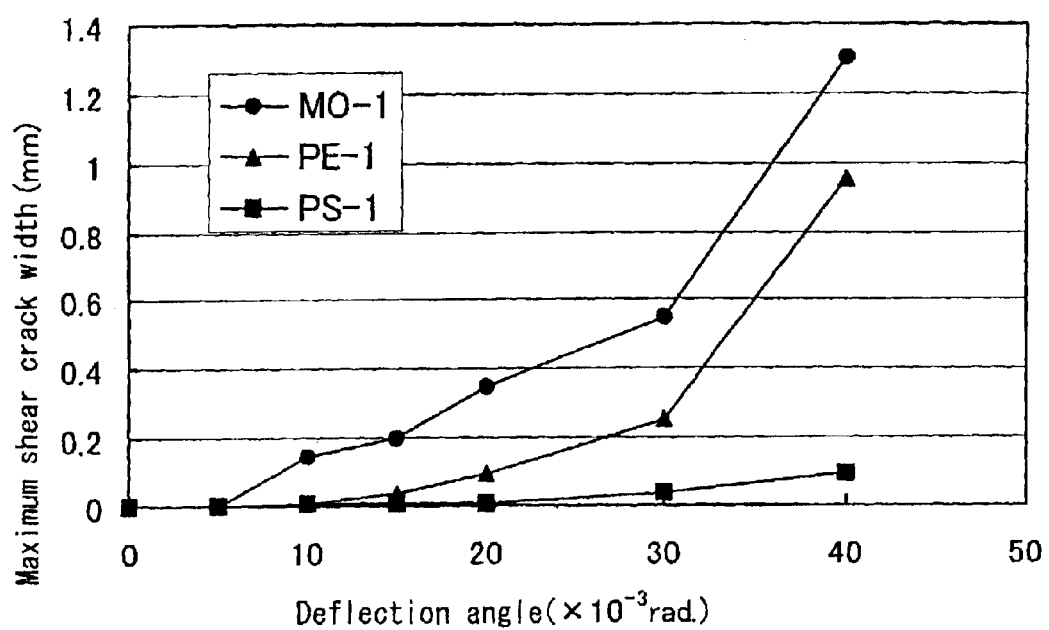
FIG. 5 shows the relationship between maximum shear crack width and deflection angle in a bar arrangement type 1.
Figure 6:
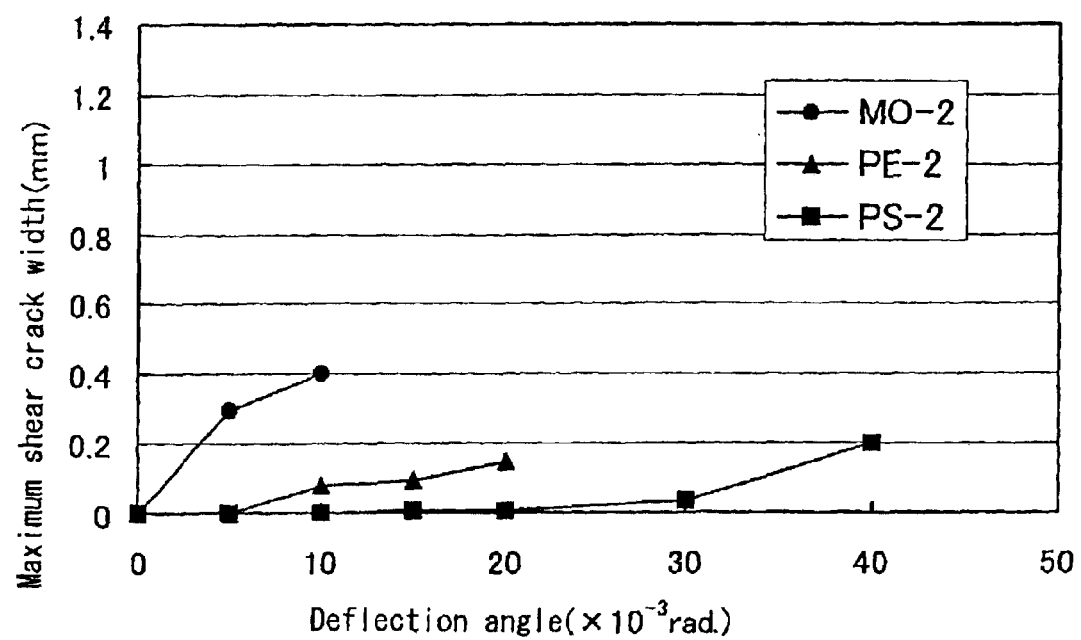
FIG. 6 shows the relationship between maximum shear crack width and deflection angle in a bar arrangement type 2.

FIGS. 5 and 6 show the results obtained by loading tests. In the loading tests, a force is horizontally applied according to the loading hysteresis shown in FIG. 4. An axial force is applied so as to constrain the axial deformation (floating deformation) accompanied by a horizontal deformation (rotating deformation) without applying an initial axial force.

In this experiment, 6 types of PS-HPFRCC, PE-HPFRCC and mortar were used as specimens. They were reinforced with reinforcements of bar arrangement type 1 comprising main reinforcing bars arranged in parallel, with shear reinforcement, and reinforcements of bar arrangement type 2 comprising main reinforcing bars arranged in an X-shape, respectively. The shear reinforcement has a yield stress of 245.1 N/mm$^2$ and a yield strain of 2474.0×10$^{-6}$, and the main reinforcing bar has a yield stress of 341.5 N/mm$^2$ and a yield strain of 1891.5×10$^{-6}$.

Hereinafter, mortar, PE-HPFRCC and PS-HPFRCC are denoted at MO, PE, and PS, respectively, and the bar arrangement types 1 and 2 used for reinforcement are denoted at 1 and 2, respectively.

MO-1; mortar and bar arrangement type 1
MO-2; mortar and bar arrangement type 2
PE-1; PE-HPFRCC and bar arrangement type 1
PE-2; PE-HPFRCC and bar arrangement type 2
PS-1; PS-HPFRCC and bar arrangement type 1
PS-2; PS-HPFRCC and bar arrangement type 2

FIGS. 5 and 6 show the relationships between maximum shear crack width and deflection angle (hereinafter referred to as $W_{cr}$-R relationship). In FIG. 5, the maximum shear crack width was increased according to increase in deflection angle in MO-1, PE-1, and PS-1, respectively. However, the maximum shear crack width according to increase in deflection angle in PS-1 was rather small, compared with MO-1 and PE-1. In FIG. 6, also, the maximum shear crack width was increased according to increase in deflection angle in MO-2, PE-2 and PS-2, but the maximum shear crack width according to increase in deflection angle in PS-2 is the smallest. Accordingly, it shows that the maximum crack width of PS is small in both the bar arrangement types 1 and 2.

Namely, it is found from the above result that PS (PS-HPFRCC) has high ductility to compressive load since PS (PS-HPFRCC) can absorb more energy than MO (mortar) and PE (PE-HPFRCC) up to the failure (fracture) in FIG. 1. It is further found from the above result that PS has high ductility also to cyclic tension-compression loads since the mixed polyethylene fiber fragments and steel cord stranded wire fragments are not deteriorated by the cyclic tension-compression loading in FIG. 3. It is found from the above results that PS has tensile resistance and ductility higher than MO and PE in FIGS. 5 and 6. Accordingly, large cracking can be prevented in PS. Consequently, the high performance fiber reinforced cement composition containing the steel cord stranded wire fragments and the organic fiber fragments has high ductility to compressive load, tensile load and cyclic tension-compression load, and the crack width can be reduced.

What is claimed is:

1. Fiber reinforced cement composition comprising:
    an amount of 0.5 vol % to 1.5 vol. %, based on a total volume of said composition, of fragments of steel cord stranded wire, said wire comprising at least two individual single wires mutually stranded together; and
    an amount, greater than zero and not exceeding 2.5 vol %, based on said total volume of said composition, of fragments of at least one organic fiber.

2. Fiber reinforced cement composition according to claim 1, wherein said wire comprises five individual single wires mutually stranded together.

3. Premix for fiber reinforced cement composition comprising:
    an amount of 1.3 vol % to 6.9 vol %, based on a total volume of said composition, of fragments of steel cord stranded wire, said wire comprising at least two individual single wires mutually stranded together;
    an amount greater than zero and not exceeding 10.8 vol %, based on said total volume of said composition, of fragments of at least one organic fiber; and
    an amount of 83 vol % to 98 vol %, based on said total volume of said composition, of cement.

4. Premix for the fiber reinforced cement composition according to claim 3, wherein said wire comprises five individual single wires mutually stranded together.

5. Premix for fiber reinforced cement composition comprising:
    an amount of 0.68 vol % to 3.6 vol %, based on a total volume of said composition, of fragments of steel cord stranded wire, said wire comprising at least two individual single wires mutually stranded together;
    an amount greater than zero and not exceeding 5.8 vol %, based on said total volume of said composition, of fragments of at least one organic fiber;
    an amount of 34 vol % to 63 vol %, based on said total volume of said composition, of cement; and
    an amount of 34 vol % to 63 vol %, based on said total volume of said composition, of aggregates.

6. Premix for the fiber reinforced cement composition according to claim 5, wherein said wire comprises five individual single wires mutually stranded together.

* * * * *